Figure 1:
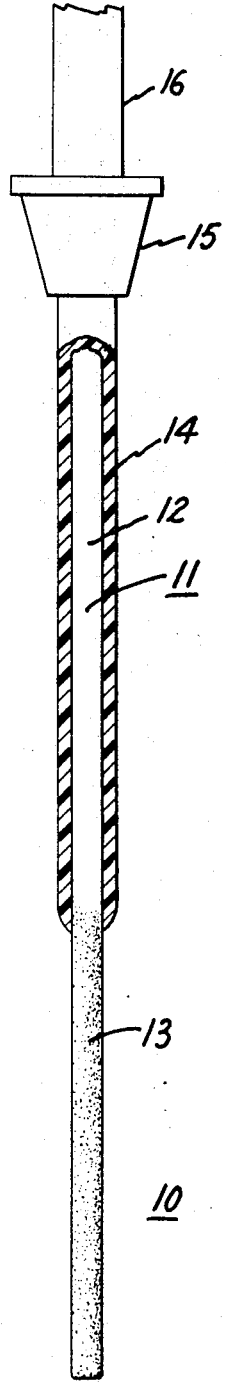

United States Patent [19]

Grubb et al.

[11] 3,709,810

[45] Jan. 9, 1973

[54] HYDROGEN ION SELECTIVE SENSOR AND ELECTRODE THEREFOR

[75] Inventors: Willard T. Grubb; Lawrence H. King, both of Schenectady, N.Y.

[73] Assignee: General Electric Company

[22] Filed: Sept. 30, 1970

[21] Appl. No.: 76,794

[52] U.S. Cl. ............................................. 204/195 R
[51] Int. Cl. ............................................. G01n 27/46
[58] Field of Search .................... 204/1 T, 195, 290 F

[56] References Cited

UNITED STATES PATENTS

| 3,103,480 | 9/1963 | Watanabe et al. | 204/195 |
| 3,462,353 | 8/1969 | Every et al. | 204/195 |
| 3,562,130 | 2/1971 | Hoole et al. | 204/195 |

FOREIGN PATENTS OR APPLICATIONS

| 1,479,762 | 3/1967 | France | 204/290 F |

Primary Examiner—T. Tung
Attorney—Richard R. Brainard, Paul A. Frank, Charles T. Watts, Paul R. Webb, II, Frank L. Neuhauser, Oscar B. Waddell and Joseph B. Forman

[57] ABSTRACT

A hydrogen ion selective sensor has a sensing electrode with a palladium oxide coated palladium surface element and a reference electrode. A specific hydrogen ion selective sensor has a sensing electrode with a palladium oxide coated palladium surface element, a reference electrode spaced from and electrically insulated from the sensing electrode, an electrically insulating cover surrounding the palladium portion of the sensing electrode and the reference electrode, the cover defining an electrolyte chamber for containing a reference electrolyte therein, and a wick extending outwardly from the chamber adjacent the palladium oxide portion of the sensing electrode. An improved hydrogen ion selective sensing electrode is described which has a palladium oxide coated palladium surface element.

3 Claims, 2 Drawing Figures

PATENTED JAN 9 1973 3,709,810

Inventors:
Willard T. Grubb,
Lawrence H. King,
by Paul R. Webb, II
His Attorney.

HYDROGEN ION SELECTIVE SENSOR AND ELECTRODE THEREFOR

Reference is made to copending patent application titled "Iridium-Iridium Oxide Electrode for Measuring pH of Blood and Other Fluids" filed Apr. 30, 1970 and given Ser. No. 33,198 in the name of Robert A. Macur.

This invention relates to hydrogen ion selective sensors and to electrodes therefor and, more particularly, to hydrogen ion selective sensors with hydrogen ion selective electrodes with a palladium oxide coated palladium surface element.

Sensors are employed to determine the content of a specific substance in a fluid or atmosphere. For example, a sensor might be employed to determine the content of oxygen, or carbon dioxide in a sample, or its content of hydrogen ions or other ions in solution.

Ion selective sensors are known in the prior art for measuring the hydrogen ion activity or pH of a sample. Such a sensor employs a reference electrode and a sensing electrode, such as a glass electrode, immersed in a solution, whereby the potential difference between the two electrodes is a function of the concentration of the hydrogen ion in the solution. The reference electrode contains a salt solution. Electrical connection between the salt solution and the sample solution is made generally by a liquid contact through an aperture referred to as a liquid junction.

Our present invention is directed to an improved miniaturized hydrogen ion selective sensor and electrode therefor which is suitable for biomedical application.

The primary objects of our invention are to provide a rugged, accurate and miniaturized ion selective sensor and hydrogen ion selective electrode for use therein.

In accordance with one aspect of our invention, an ion selective sensor comprises a hydrogen ion electrode which has a base member, an exterior surface of palladium on the base member, and palladium oxide adhering tightly to at least a portion of the palladium surface; a reference electrode spaced from and electrically insulated from the hydrogen ion selective electrode, an electrically insulating cover surrounding the palladium surface portion of the hydrogen ion selective electrode and the reference electrode, the cover defining an electrolyte chamber for containing a reference electrolyte in contact with the reference electrode, and a wick positioned partially in the chamber and partially outside the cover adjacent the palladium oxide portion of the hydrogen ion selective electrode.

Figure 2:
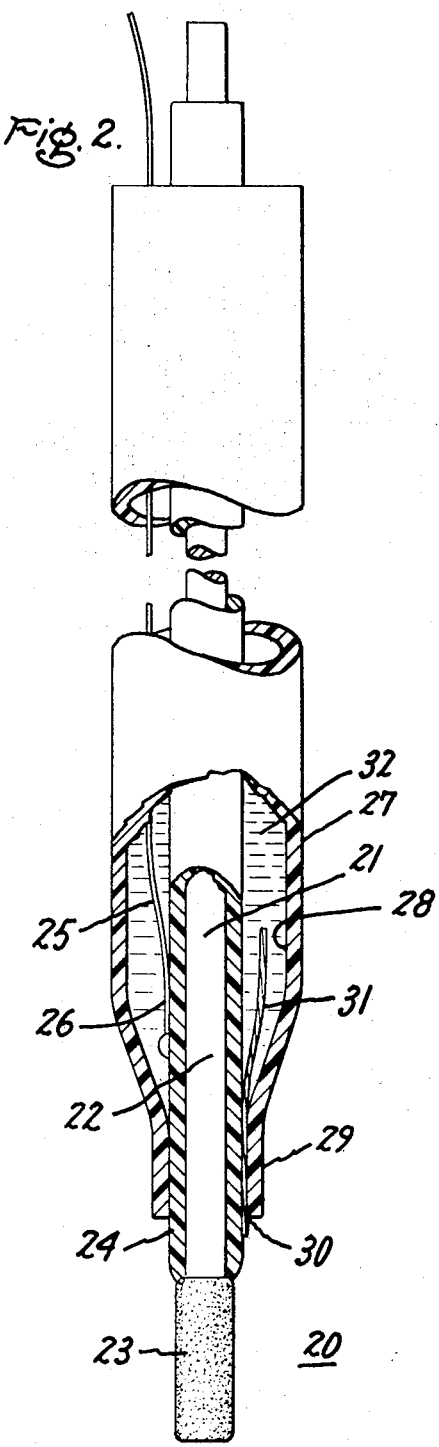

These and various other objects, features and advantages of the invention will be better understood from the following description taken in connection with the accompanying drawing in which:

FIG. 1 is a sectional view of a hydrogen ion selective electrode made in accordance with our invention; and FIG. 2 is a sectional view of a hydrogen ion selective sensor made in accordance with our invention.

In FIG. 1 of the drawing, there is shown generally at 10 a hydrogen ion selective electrode made in accordance with our invention. Electrode 10 is shown in the form of an elongated base member 11 with an exterior surface of palladium 12 on base member 11, and palladium oxide 13 adhering tightly to at least a portion of the palladium surface. The palladium surface 12 is also shown with a circular fluid-tight insulation layer 14 of a suitable electrically insulating polymer bonded thereto. The insulated portion of palladium surface 12 extends into an adapter 15. The proximal end of elongated base member 11 terminates in a connector which is shown generally in 16. A suitable electrical lead (not shown) is connected to elongated base member 11 by being joined in connector 16. The hydrogen ion selective electrode can be inserted in the interior of a catheter for insertion within a body cavity, or used for clinical analysis.

In FIG. 2 of the drawing, there is shown generally at 20 an ion selective sensor made in accordance with our invention and employing a hydrogen ion selective electrode therein. Sensor 20 is shown with a hydrogen ion selective electrode 21 in the form of an elongated rod or wire. Electrode 21 is shown as a palladium base member which therefor has the surface of palladium 22 thereon. Other base materials with a palladium surface deposited thereon can be employed. Adjacent one end of electrode 21 palladium oxide 23 adheres tightly to a portion of the palladium surface. A layer of Alkanex polyester resin lacquer 24 covers the palladium surface 22. This insulation 24 can also slightly overlap or be adjacent the palladium oxide 23. A reference electrode 25 in the form of a silver wire is applied to the outer surface of insulation 24 and provides the reference electrode for the sensor. The lower end of reference electrode 25 is provided as at 26 with a coating of silver chloride. The opposite end of electrode 25 extends outwardly from the device in connection to an electrical lead (not shown). In this manner reference electrode 25 is spaced and electrically insulated from sensing electrode 21.

An electrically insulating cover 27 of a suitable material such as heat shrinkable polyolefin tubing surrounds the palladium surface portion 22 of sensing electrode 21, and reference electrode 25 with its silver chloride coating 26. Cover 27 defines an electrolyte chamber 28 which chamber is in contact with reference electrode 25. The upper end of cover 27 is shown as open while the lower end of cover 27 is fitted tightly, for example by heat shrinking, as at 29 around inner insulation 24 to form a closure except at one point 30 which provides the liquid junction. A wick 31 is positioned partly in the electrolyte chamber and partly outside or flush with cover 27 adjacent the palladium oxide portion 23 of sensing electrode 21. An electrolyte 32 is contained within the chamber defined by cover 27.

We found that we could form an improved hydrogen ion selective electrode which electrode was also useful in a hydrogen ion selective sensor. We found that we could provide such an electrode from a base member which had a surface of palladium thereon. Such an electrode requires further that palladium oxide adhere tightly to at least a portion of the palladium surface. We found that such a base member may be made of any number of materials which can withstand the high temperature treatment to provide the palladium oxide coating. We further found that any number of metals could be employed for the base member to which a surface of palladium could be applied. In its preferred form we, of course, provide the base member in the form of palladium metal whereby it has a surface of palladium.

We found that various disk, rod, wire or irregular shaped hydrogen ion selective electrodes could be prepared in accordance with our invention. pH measurement can be carried out in various ways with such electrodes. Wire-shaped electrodes can be dipped into a solution to be measured either with an associated reference electrode or in the above sensor structure. Rod shaped electrodes can be mounted through the wall of a tube carrying a stream of liquid to monitor the pH. Disk-shaped electrodes can form the bottom of a cup into which a sample of liquid for pH measurement is placed.

As distinct from glass pH electrodes, the present electrodes possess the advantage that they are rugged, easily miniaturizable, can be readily fabricated in a wide variety of shapes and sizes, and possess a low impedance voltage signal to the measuring circuit. The volt meter used for measuring the voltage of our hydrogen ion selective electrode to determine the pH of a sample can be as low as about 10 megohms. Glass electrodes require ordinarily electrometer type meters with input impedances in the range of 1 million megohms or greater.

We discovered unexpectedly that we could form an improved hydrogen ion selective electrode. As it was referenced above the copending application Ser. No. 33,198 described and claimed an iridium-iridium oxide electrode. While it would appear that any of the four Group VIII of noble metals available in wire form could be employed as an electrode by providing the respective oxide thereon, this does not occur. Both rhodium and platinum can have an oxide layer applied thereon but such oxide layer is visually different in that it is tan in color and quite different in appearance from the nearly black coating formed of palladium oxide on a palladium surface. The rhodium wire which had been oxidized did not sense pH at all. The platinum wire which had been oxidized produced a voltage change in the right direction between pH 7 and 8 but with an exceedingly long time constant. Thus neither rhodium nor platinum can have its respective oxide applied thereto and function usefully as a hydrogen ion selective electrode. In contrast to this we found that our hydrogen ion selective electrode functioned very effectively for the measurement of pH.

We found unexpectedly that we could employ our above hydrogen ion selective electrode as the sensing electrode to provide an improved hydrogen ion selective sensor. For example, such a sensor can be formed by employing an elongated hydrogen ion selective electrode with a palladium oxide coated palladium surface element, and a reference electrode spaced from and electrically insulated from the sensing electrode. The preferred reference electrode is a silver wire with a silver chloride coating on one end. We found that the electrical insulation on the palladium surface portion can be made from a variety of materials such as Alkanex polyester resin lacquer, polyphenylene oxide, Viton hexafluoropropylene-vinylidene fluoride rubber, silicone rubber, Lucite plastic, etc. An electrically insulating cover or tube surrounds both the palladium surface portion of the sensing electrode and the reference electrode. Similarly, this cover or tube may be made from a wide variety of electrically insulating materials. We found, however, that a polyolefin which is heat shrinkable in tube form can be used in a most satisfactory manner. For example, the tube can be slipped over the two electrodes and the end of the tube adjacent the palladium oxide heat shrunk to bond the tube at its one end to the first layer of insulation. The cover provides an electrolyte chamber which is in contact with the reference electrode. A wick is positioned partially in the chamber and partially outside or flush with the cover adjacent the palladium oxide portion of the hydrogen ion selective electrode to provide a liquid contact structure. The chamber is normally filled with a reference electrolyte such as potassium chloride. The wick is preferred to be a length of multifilamentary thread such as glass thread.

We have found that we can prepare the hydrogen ion selective electrode by employing the high temperature reaction of palladium with oxygen from the air in the presence of an alkali metal hydroxide. The parameters of preparing such an oxide electrode were investigated as to the choice of time and temperature of the reaction, the choice of the alkali metal hydroxide and its concentration, precleaning and roughening of the palladium base member and the use of electrical insulation on the portion of the base member. We found that treating the exterior palladium surface of the base member at a temperature of 800°C appears to be the optimal temperature. However, palladium oxide can be formed on such a surface as low as 350°C and up to about 938°C where the oxide decomposes. Of the alkali metal hydroxides tested, sodium hydroxide gave the best electrode with potassium hydroxide providing good electrodes. We found that lithium hydroxide did not appear to work. In the process, precleaning and roughening of the exterior palladium surface of the base member was found to be required for best results. Such precleaning and roughening was accomplished by dipping in aqua regia for about 30 seconds or sand blasting or a combination of both. The heating period at 800°C was varied from about 25 seconds to 120 minutes. Within this time period the optimal time was 10–20 minutes. When electrical insulation was applied on the exterior palladium surface of the base member after oxidation of the other portion of the surface of the base member to a palladium oxide surface the results were more reproducible.

A preferred method of forming a hydrogen ion selective electrode made in accordance with our invention was to employ an elongated base member of palladium which was dipped at one end into the aqua regia for 30 seconds to etch and preclean the surface. The cleaned end was rinsed and then dipped into a 50 weight percent solution of sodium hydroxide. The same end of the elongated base member was then placed for 20 minutes in the hot zone of a furnace controlled at 800°C. The palladium base member with a black palladium oxide coating portion adhering tightly to the one end of the palladium base member was removed from the furnace, rinsed in flowing distilled water and stored in distilled water or a neutral buffer solution. Subsequently, the electrode was rinsed, dried and a layer of electrical insulation of Alkanex lacquer was applied from the upper end of the palladium oxide coating to near the opposite end of the base member. After drying, the Alkanex lacquer was cured. A segment of uninsulated base member was provided at the opposite end to provide for a connection of an electrical lead subsequently thereto. This method results in the production of an improved hydrogen ion selective electrode made in accordance with our invention.

The hydrogen ion selective sensor made in accordance with our invention can be formed preferably by employing a hydrogen ion selective electrode made as above described. In the above preparation the palladium base member with palladium oxide on one end has applied to its palladium surface portion a layer of Alkanex polyester resin lacquer which has been coated thereon from a solution containing a cresol solvent. The solvent is then evaporated and the Alkanex lacquer is cured. A chlorided silver wire is then applied to the outside of the Alkanex lacquer insulation from a point adjacent the palladium oxide coating and extending therefrom along the length of the insulation. A heat shrinkable tube of polyolefin was placed around the two electrodes separated by the first insulation to thereby form a concentric chamber. The end of the tube near the palladium oxide coating was heat shrunk to bond with the first electrical insulation except for a small opening therein containing a multifilament fiber. The fiber or wick is positioned initially against the exterior surface of the first electrical insulation so that when the cover is heat shrunk on to the first insulation the wick will be positioned partially within the cover and partially outside or flush the cover adjacent the palladium oxide portion of the sensing electrode. In this manner the cover defines a chamber which contains the reference electrode. A reference electrolyte such as 0.1 to 4 normal potassium chloride solution was placed in the chamber by inserting the end of the sensor in a test tube filled with the solution. Over a 24 hour period a sufficient amount of the solution entered the chamber through the wick junction. Similarly, the filling can be accomplished by use of a syringe. The opposite end of the sensor comprises an uninsulated portion of the sensing electrode and a portion of the reference electrode which are connected to suitable leads so that a voltage can be measured thereacross. This resulted in a hydrogen ion selective sensor made in accordance with our invention.

Examples of hydrogen ion selective electrodes and hydrogen ion selective sensors employing such electrodes made in accordance with our invention are as follows:

EXAMPLE 1

A hydrogen ion selective electrode was prepared as described above. A portion of a palladium wire 30 mils in diameter was etched briefly in aqua regia, rinsed in distilled water, dipped in 50 percent aqueous sodium hydroxide solution and heated in an oven controlled at 800°C for 10 minutes. During the heat-up, the sodium hydroxide became molten and distributed itself in an even manner over the lower end of the wire at the same time the formation of a black coating of palladium oxide was evident. This black coating was observed to creep up the wire as the molten sodium hydroxide wetted the wire and spread upward under the influence of surface tension forces. The electrode was cooled, rinsed in water and stored in a pH 7.4 phosphate buffer.

After 2 days storage, this electrode was tested in a series of phosphate buffers over the pH range of 6.0 to 8.0. The results of these tests are shown below in Table I in which is listed the voltage against a reference electrode, Ag-AgCl in saturated KCl as a function of pH. Response time was 30 seconds or less for a 1 unit change in pH, and there was no hysteresis within 1 millivolt as the pH was varied in the order 7, 8, 7, 6, 6.6, 7, 7.6, 8. The selected values were stable within about 1 millivolt for 1 hour or more.

The slope in millivolts per pH unit is very close to the theoretical slope of 59 millivolts per pH unit.

TABLE I

| pH | Millivolts Versus Reference Electrode —mV |
|---|---|
| 6.0 | 358 |
| 7.0 | 300 |
| 8.0 | 240 |

EXAMPLE 2

Thirty-four palladium-palladium oxide electrodes were made as described above. Each electrode was made as follows: A 30 mil diameter palladium wire 4 inches in length was dipped one-half inch on one end into aqua regia for 30 seconds to etch and preclean the surface. The cleaned end was rinsed; then dipped into a 50 weight percent solution of sodium hydroxide. This end was placed for 20 minutes in the hot zone of a furnace controlled at 800°C. The wire with its black oxide coating of palladium oxide on one end was then removed, rinsed in flowing distilled water for 30 seconds and stored in a dilute pH 7.4 phosphate buffer.

Most of the electrodes were subsequently rinsed, dried, and insulated from the upper end of the palladium oxide coating to near the opposite end of the wire. An uninsulated section on that end was left for electrical connection. Two insulating methods were employed. A polyolefin shrink tube was used for one electrode while a solution of polymethyl methacrylate in ethylene dichloride was painted on with a soft brush and air dried to provide the other 33 electrodes.

The 34 electrodes were tested in the following manner. Each electrode was removed from its storage solution, immersed in a pH 7 buffer and its voltage measured against a silver-silver chloride, saturated KCl, fiber junction reference electrode. The voltage was recorded on a recording millivoltmeter. Readings were taken upon reaching steady state as defined by the criterion of no more than 0.1 millivolt drift in 1 minute. This corresponded to a drift of slightly less than 0.002 pH units per minute. Such a drift rate is in keeping with the high precision required for pH measurement in clinical laboratories and in patient monitoring. After steady state was reached in the pH 7 buffer, the electrode and reference were rinsed with distilled, deionized water and immersed in pH 8 buffer. The steady state reading was taken as before, and the time constant for the electrode was estimated. The steady state readings on the present electrodes were achieved in unstirred solutions in times of 1 minute or less, often only a few seconds. Following the pH 8 reading, the electrode was returned to pH 7 buffer and remeasured. Correspondence within 1 millivolt to the initial reading was achieved in a preponderance of the electrodes measured.

Out of the 34 electrodes tested in the above manner, two were rejected due to excessive drifting in the readings at the initial pH. The remaining 32 electrodes represented the basis for a brief statistical analysis. Their reproducibility in voltage at pH 7 and in the millivolts change per pH unit between pH 7 and 8 was determined.

The above results are summarized below. In Table II the voltage is shown of a single electrode from pH 2 to about pH 9. The theoretical potential pH line for the reaction of palladium with water to form palladium (II) oxide monohydrate is a slope of 59.2 mV per pH unit. The average slope between pH 7 and 8 for 32 electrodes was 56.3 mV/pH unit with a standard deviation of 1.15 millivolts. Thus, an electrode with a single point calibration at pH 7.5 would read at pH 7.0 and pH 8.0 to an accuracy of ±0.02 pH units at twice the standard deviation in slope for this group of electrodes. The mean voltage of the 32 electrodes at pH 7 was 273.5 with a standard deviation of 14.5 mV. For the reaction $Pd + 2H_2O \longrightarrow PdO \cdot H_2O + 2H^+ + 2e^-$, a calculated value of 283 mV would be observed at pH 7.

TABLE II

| pH | Millivolts Versus Reference Electrode —mV |
|---|---|
| 2.0 | 545 |
| 3.0 | 485 |
| 4.0 | 430 |
| 5.0 | 380 |
| 6.0 | 320 |
| 7.0 | 270 |
| 8.0 | 205 |
| 9.0 | 150 |

EXAMPLE 3

A hydrogen ion selective sensor was made in accordance with our invention as above described. The hydrogen ion selective electrode was a 30 mil diameter wire of palladium coated on one end with palladium oxide. The palladium portion of the electrode was insulated with Alkanex polyester resin lacquer from a cresol solvent after which the solvent was evaporated and the Alkanex polyester resin lacquer was cured. The insulation overlapped slightly the palladium oxide portion of the electrode. A 2 mil diameter silver wire coated on one end with silver chloride was applied to the exterior surface of the Alkanex polyester resin lacquer and extended from adjacent the palladium oxide portion of the hydrogen ion selective electrode along the length of the insulation. A piece of heat-shrinkable polyolefin tube with an internal diameter of 60 mils was positioned around the sensing electrode first insulation and reference electrode. A short length of a multifilamentary glass thread was positioned adjacent the end of the first insulation so that a portion of the thread or wick was within the polyolefin tubing and a portion extended outwardly adjacent the palladium oxide portion of the sensing electrode. The end of the tubing adjacent the palladium oxide portion of the hydrogen ion selective electrode was shrunk to seal against the insulated palladium wire by heating that portion of the partially assembled structure to about 120°C for 1 minute. In this manner the wick extending from the polyolefin tubing provided a liquid junction. An annular reference electrolyte chamber was defined between the interior surface of the tubing and the insulated portion of the palladium wire. This chamber was filled with about 50 microliters of 0.1 normal potassium chloride solution by inserting the wick and adjacent structure of the sensor into a test tube with the potassium chloride solution for a period of 24 hours.

The assembled device was a hydrogen ion selective sensor made in accordance with our invention. The overall length of the sensor was 4 inches and the maximum outer diameter was 0.070 inches. The electrode was tested as series of buffers to determine its characteristics. These data are set forth below in Table III. The voltage was a good linear function of pH with a slope of 58.1 millivolts per pH unit at 24°C. The response to pH changes was such that steady readings were obtained after 2 minutes or less.

TABLE III

| pH | Millivolts Versus pH For pH—Reference Electrodes —mV |
|---|---|
| 2.0 | 435 |
| 3.0 | 385 |
| 4.0 | 325 |
| 5.0 | 270 |
| 6.0 | 210 |
| 7.0 | 150 |
| 8.0 | 100 |
| 9.0 | 45 |

EXAMPLE 4

A hydrogen ion selective electrode was prepared in which it was desired to confine the palladium oxide on the palladium wire to an exactly determined area of the wire. The palladium wire which was 30 mils in diameter was gold plated with 0.0025 inch of gold. The end of the gold plated coated wire was then sand blasted for a length of one-sixteenth of an inch from one end of the wire to remove the gold plating therefrom. The one-sixteenth of an inch of the wire was dipped in 50 weight percent aqueous sodium hydroxide. The structure was dried for 5 minutes in dry nitrogen which was flowed at a rate of 10 cubic feet per hour in a half liter jar. The structure was then oxidized for 15 minutes in an oven controlled at 800°C with an oxygen flow of one cubic foot per hour. The one-sixteenth of an inch of the wire without the gold plate formed a black coating of palladium oxide thereon. The electrode was then rinsed for 15 minutes in water and then stored in water for 20 hours. Subsequently, the electrode was dried for 2 hours in an air atmosphere. Three coatings of Alkanex polyester resin lacquer were applied over the gold plated portion of the electrode. After each coating of Alkanex polyester resin lacquer, the lacquer was dried and cured. The resulting structure was a hydrogen ion selective electrode made in accordance with our invention.

This electrode showed an extremely fast response time. Between pH 7 and pH 8 the response time was about 1 second and the change of voltage was 58.5 mV.

EXAMPLE 5

A hydrogen ion selective electrode was prepared as in Example 1. The heating time at 800°C was 15 minutes. After the palladium oxide coating had formed on a portion of the exterior of the palladium wire the electrode was rinsed for 15 minutes in water and then soaked overnight in water. The following morning the electrode was dried and submitted for metallographic examination where the electrode was cross-sectioned and metallographic pictures were taken. A coating of palladium oxide on the palladium wire was remarkably uniform, being between 0.3 and 0.4 thousandths of an inch and accurately following the surface contours of the palladium wire substrate.

EXAMPLE 6

A hydrogen ion selective electrode was prepared by employing a 30 mil diameter Nichrome wire which was then plated with a 0.0095 inch thickness of palladium. One-half inch of this wire at one end was dipped in 50 percent aqueous sodium hydroxide solution. The structure was dried for 5 minutes in dry nitrogen which was flowed at a rate of 10 cubic feet per hour in a half liter jar. The structure was then oxidized for 15 minutes at 800°C with an oxygen flow of 1 cubic foot per minute whereby a black coating of palladium oxide was formed on the one-half inch of the wire. After rinsing for 15 minutes in water the electrode was soaked overnight in water. The exterior palladium surface was provided with electrical insulation by painting on 50 weight percent room temperature vulcanizing silicone from a solvent. This electrode was then tested in a series of buffers and produced a voltage change of 57.0 mV per pH unit in the range of pH 7 to pH 8.

EXAMPLE 7

A hydrogen ion selective electrode was prepared by welding a flat disc of palladium metal 0.25 inch in diameter by 0.030 inch in thickness to a platinum wire having a diameter of 0.030 inch. The exterior face of the palladium disc was sand blasted after which it was dipped into a 50 percent aqueous sodium hydroxide solution. The structure was then dried for 15 minutes in dry air. The structure was then oxidized for 15 minutes in an oven at 800°C. A black coating of palladium oxide formed on the exterior surface of the plate. After rinsing for 15 minutes in running water, the electrode was soaked in water overnight. No insulation was applied. The electrode was tested for its response to pH which was 56.3 mV per pH unit in the range of pH 7 to pH 8.

While other modifications of the invention and variations thereof which may be embraced within the scope of the invention have not been described, the invention is intended to include such as may be embraced within the following claims.

What we claim as new and desire to secure by Letters Patent of the United States is:

1. A hydrogen ion-selective sensor comprising a hydrogen ion-selective electrode in the form of an elongated wire, said electrode comprising a base member, an exterior surface of palladium on the base member, and palladium oxide adhering tightly to at least a portion of the palladium surface; a reference electrode spaced from and electrically insulated from the hydrogen ion-selective electrode, an electrically insulating cover surrounding the palladium surface portion of the hydrogen ion-selective electrode and the reference electrode, the cover defines an electrolyte chamber in contact with the reference electrode, and a wick positioned partially in the chamber and partially outside the cover adjacent the palladium oxide portion of the hydrogen ion-selective electrode.

2. A hydrogen ion selective sensor as in claim 1, in which the electrically insulating cover is polyolefin heat-shrinkable tubing.

3. A hydrogen ion selective sensor as in claim 1, in which a reference electrolyte is contained in the chamber.

* * * * *